Patented Aug. 26, 1941

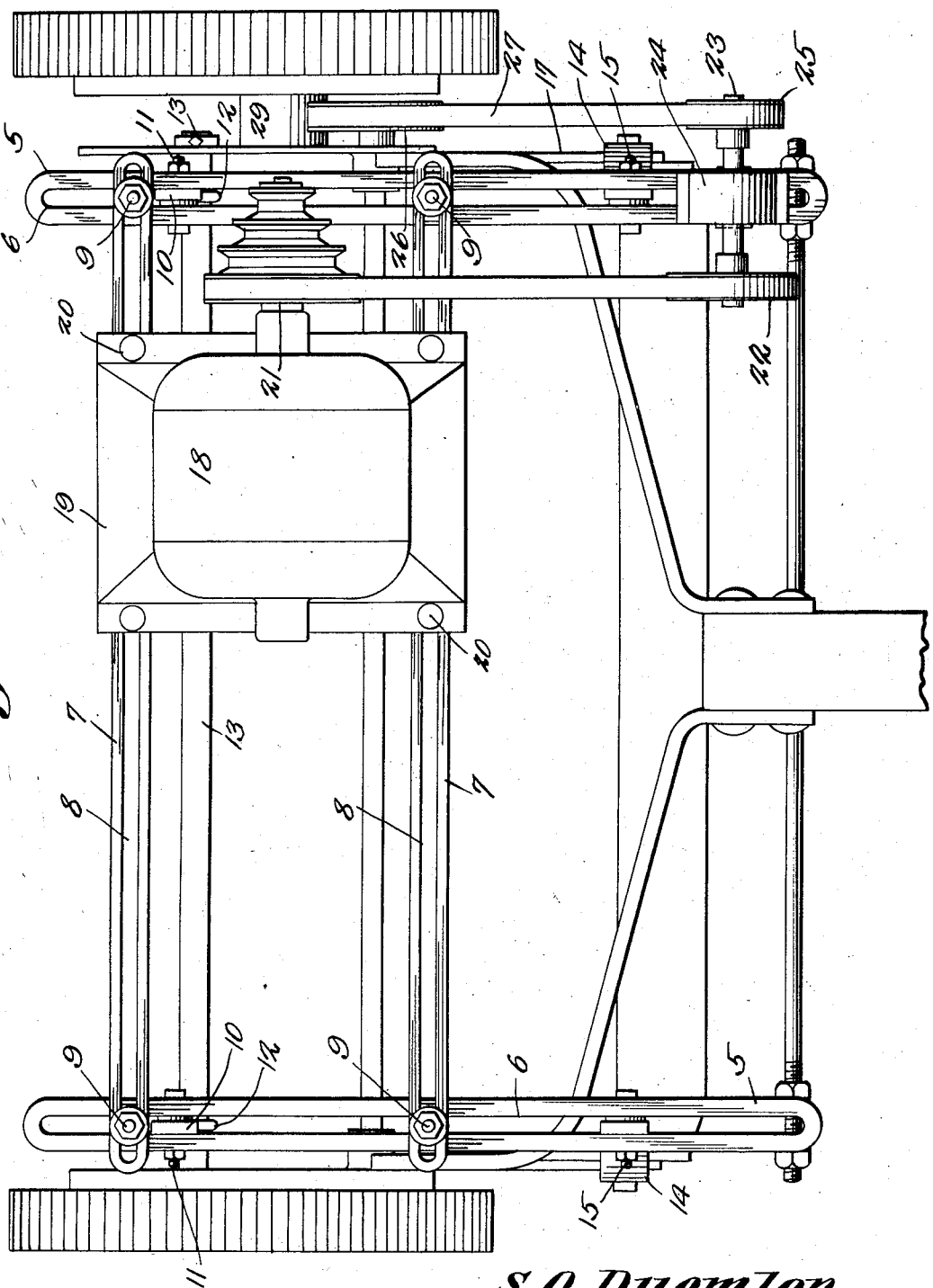

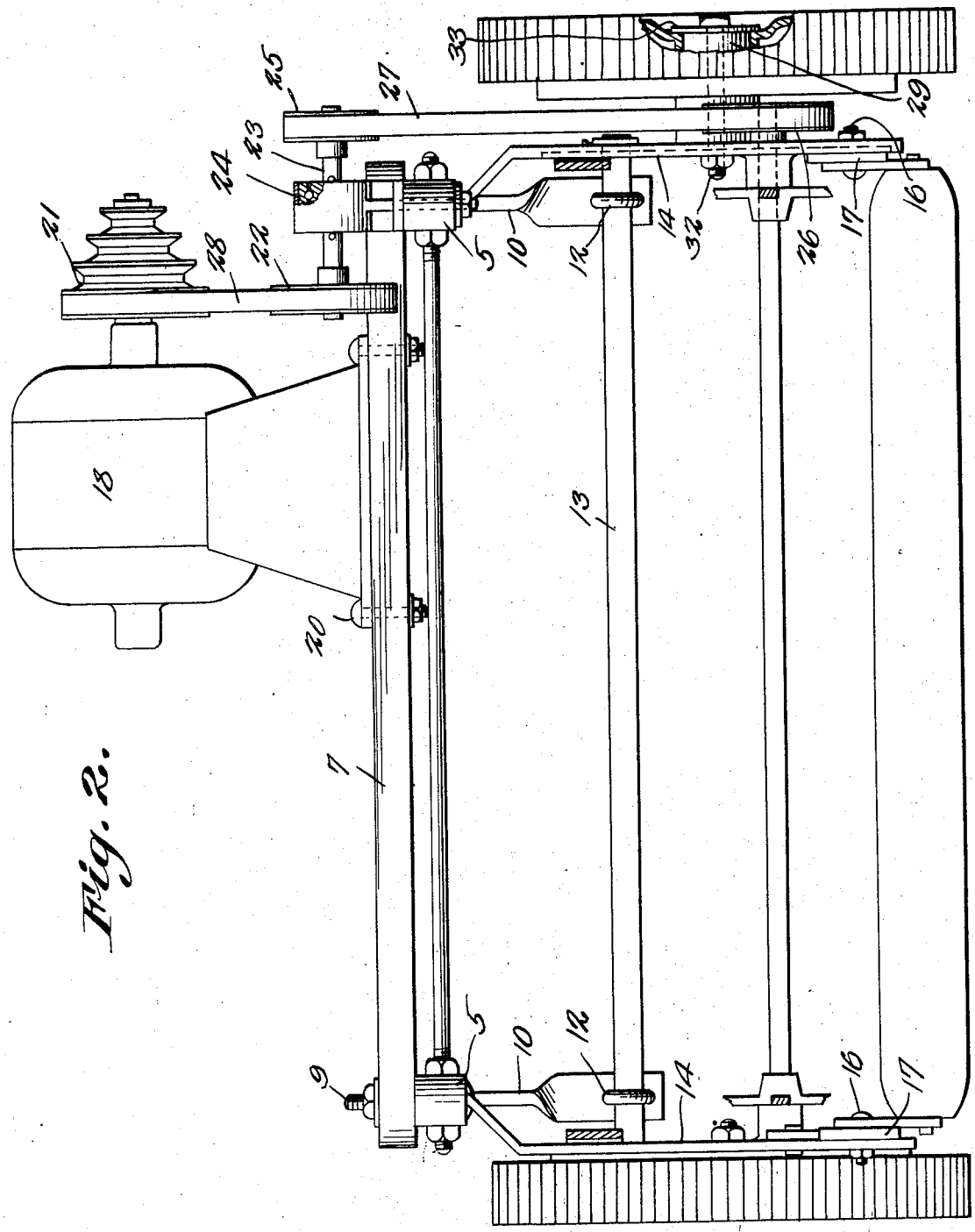

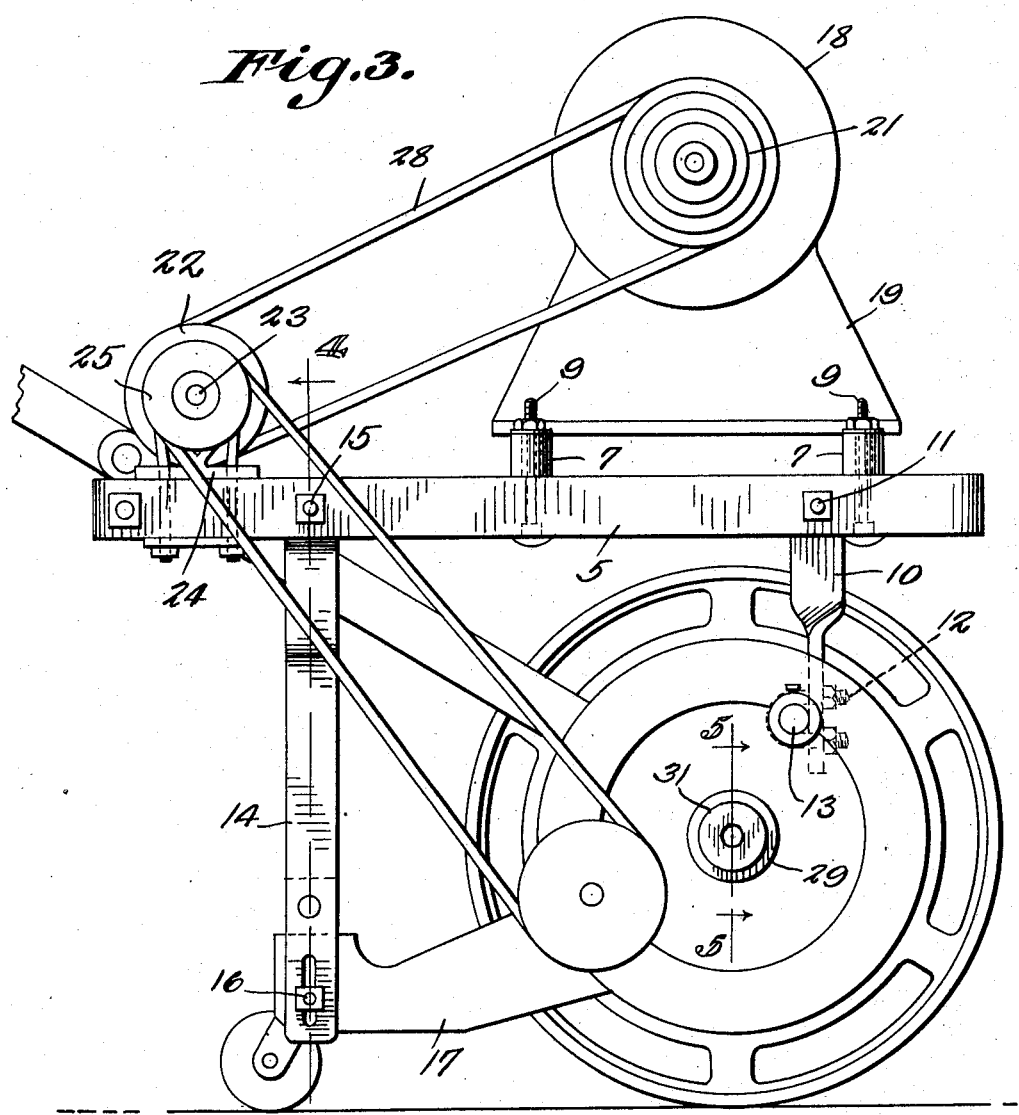
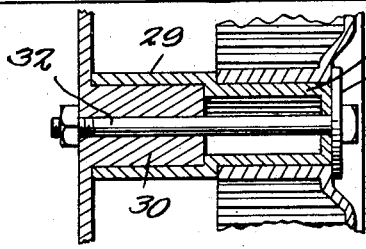
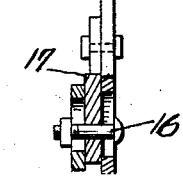

2,253,899

UNITED STATES PATENT OFFICE 2,253,899

MOTOR MOWER

Samuel O. Duemler, Pacific Beach, Calif.

Application June 17, 1940, Serial No. 341,049

2 Claims. (Cl. 56—26)

This invention relates to motor propelled lawn mowers, the primary object of the invention being to provide means whereby the usual lawn mower may be readily and easily converted into a power mower, eliminating the necessity of making extensive alterations in the construction of the mower to which the motor is attached, in order to mount the power attachment.

An object of the invention is to provide a device of this character including a motor support which is so constructed that it may be used in connection with lawn mowers of various widths and sizes, the device comprising mainly an adjustable frame constructed in such a way that the motor mounted thereon may be moved to various positions with respect to the frame to align the pulley mounted on the motor shaft, with the power pulley of the mower.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view of a lawn mower equipped with a demountable frame constructed in accordance with the invention, and illustrating a motor mounted thereon.

Figure 2 is a front elevational view thereof.

Figure 3 is a side elevational view of the mower with the attachment mounted thereon, one wheel of the mower having been removed to illustrate the pulley used in rotating the blades of the mower.

Figure 4 is a sectional view taken on line 4—4 of Figure 3.

Figure 5 is a sectional view taken on line 5—5 of Figure 3.

Referring to the drawings in detail, the demountable frame comprises end bars 5 that are formed with elongated openings 6, which are connected by the transversely disposed bars 7 that are also provided with elongated openings 8.

As clearly shown by Figure 1 of the drawings, the bars 7 overlie the bars 5, and bolts 9 are extended through the registering elongated openings of the end bars 5 and bars 7, securing the bars 7 to the bars 5. Due to this construction, it will be seen that the frame, which supports the motor, to be hereinafter more fully described, may be adjusted for use in connection with lawn mowers of various sizes.

Secured to the end bars 5, and depending therefrom, are substantially short arms 10, the arms being bolted to the end bars by means of bolts 11. U-bolts indicated at 12 extend through the arms 10 and engage the usual transversely disposed brace rod of a lawn mower frame, the brace rod being indicated by the reference character 13.

The rear of the demountable frame, is supported by means of the legs 14 that are bolted to the end bars 5, by means of bolts 15, the lower ends of the legs 14 being formed with elongated openings for the reception of the bolts 16, which bolts also extend through the rearwardly extended arms 17 forming a part of the usual lawn mower construction, and which provide a support for the stationary blade and roller of the usual lawn mower. Due to this construction, it will be seen that the rear portion of the frame may be readily moved vertically, to properly adjust the frame.

The motor, which in the present showing is of the electric type, is indicated by the reference character 18. The motor includes a base 19 which is formed with openings at its corners, for the reception of the bolts 20 that extend through the elongated openings 8, securing the motor to the frame. It will also be noted that due to the manner of mounting the motor, the motor may be adjusted longitudinally of the transversely disposed bars 7 so that the pulley indicated at 21, and which is mounted on the motor shaft, may be moved into alignment with the pulley 22 mounted on one of the end beams 5. The pulley 22 is disposed on the shaft 23 that is mounted in the bearings 24, there being provided a pulley 25 on the opposite end of the shaft 23 which is in direct alignment with the pulley 26 secured to the usual cutter blade shaft. A belt indicated at 27 operates over the pulleys 25 and 26, so that rotary movement of the shaft 23, will be transmitted to the pulley 26 and blade shaft, to operate the blades of the mower.

The pulley 21 is substantially cone-shaped, so that the belt 28, which operates over the pulleys 21 and 22, may be operated at various speeds. It will be seen that by adjusting the motor to bring one of the smaller portions of the pulley 21 to a position under the belt 28, the speed of the shaft 23 and consequently the blade shaft of the mower, may be increased. This adjustment may be readily made by merely loosening the bolts 9 and moving the bars 7 longitudinally of the end bars 5, and by loosening the bolts 20 and adjusting the motor longitudinally of the bars 7.

In mounting the frame, the usual lawn mower wheel at one end of the mower is removed, and a tubular shaft such as indicated at 29 and shown more particularly by Figure 5 of the drawings, is positioned over the stub shaft 30 on which the usual wheel of the mower operates. The tubular shaft 29 is formed with a reduced end 31 and the wheel which has been removed from the stub shaft 30, is positioned over the reduced end 31 of the shaft 29, the reduced end being of a diameter equal to the diameter of the shaft 30.

A bolt indicated at 32 extends through the shaft 30 and reduced end 31 of the shaft 29, the bolt providing a support for the disk 33 that engages the wheel, securing the wheel in position.

By adding the tubular shaft 29 and mounting the wheel of the mower thereon, a clearance is provided for the pulley 26.

Wires not shown, will of course be connected with the motor and have connection with a suitable source of electricity supply. By closing a switch and completing an electric circuit to the motor, the motor will operate to rotate the pulleys 21, 22, 23 and 26, which transmit movement to the blade shaft of the mower.

While I have shown and described an electric motor for driving the blades of the mower, it is to be understood that a small internal combustion engine may be mounted on the frame, in lieu of the electric motor 18, to accomplish the result as described.

What is claimed is:

1. A motor attachment for lawn mowers, comprising a frame embodying end bars having elongated openings, transversely disposed front and rear bars having elongated openings, the ends of the latter bars adapted to overlie the end bars, bolts extending through the elongated openings and adjustably connecting the bars, means for removably securing the frame to a lawn mower frame, a motor adjustably mounted on the transversely disposed bars, and means for transmitting movement of the motor to the mower blades.

2. A motor attachment for lawn mowers, comprising a frame embodying end bars, transversely disposed front and rear bars, said bars having elongated openings, the ends of the transversely disposed bars overlying the end bars, bolts extending through the elongated openings of the overlapped ends of the transverse bars and end bars, leg members secured to the frame and extending downwardly therefrom, means for securing the leg members to the frame of the motor vehicle with which the attachment is used, a motor adjustably mounted on the transverse bars, and means for transmitting movement of the motor to the mower.

SAMUEL O. DUEMLER.